United States Patent [19]

Takeda et al.

[11] Patent Number: 4,892,379
[45] Date of Patent: Jan. 9, 1990

[54] FIBER OPTIC CONNECTOR

[75] Inventors: Mitsuru Takeda; Koji Mizunuma, both of Tochigi, Japan

[73] Assignee: Amphenol Corporation, Wallingford, Conn.

[21] Appl. No.: 624,445

[22] Filed: Jun. 25, 1984

[30] Foreign Application Priority Data

Jul. 4, 1983 [JP] Japan .............................. 58-102736[U]

[51] Int. Cl.$^4$ .............................................. G02B 6/38
[52] U.S. Cl. .................................................. 350/96.21
[58] Field of Search ................ 350/96.15, 96.20, 96.21

[56] References Cited

U.S. PATENT DOCUMENTS

| 4,404,010 | 9/1983 | Bricheno et al | 350/96.21 |
| 4,490,007 | 12/1984 | Murata | 350/96.21 |
| 4,509,820 | 4/1985 | Murata et al. | 350/96.21 |

Primary Examiner—William L. Sikes
Assistant Examiner—Robert E. Wise
Attorney, Agent, or Firm—Bacon & Thomas

[57] ABSTRACT

An adaptor for a fiber optic connector of the type which utilizes a split sleeve to align ferrules from oppositely facing connectors. The sleeve has a longitudinal slit and the ferrules receive the optical fiber. A tubularly shaped elastic body is installed around the outer periphery of the split sleeve, the body applying a spring force to the periphery of the split sleeve.

21 Claims, 4 Drawing Sheets

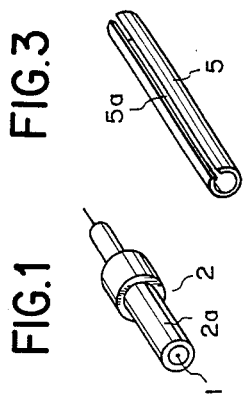
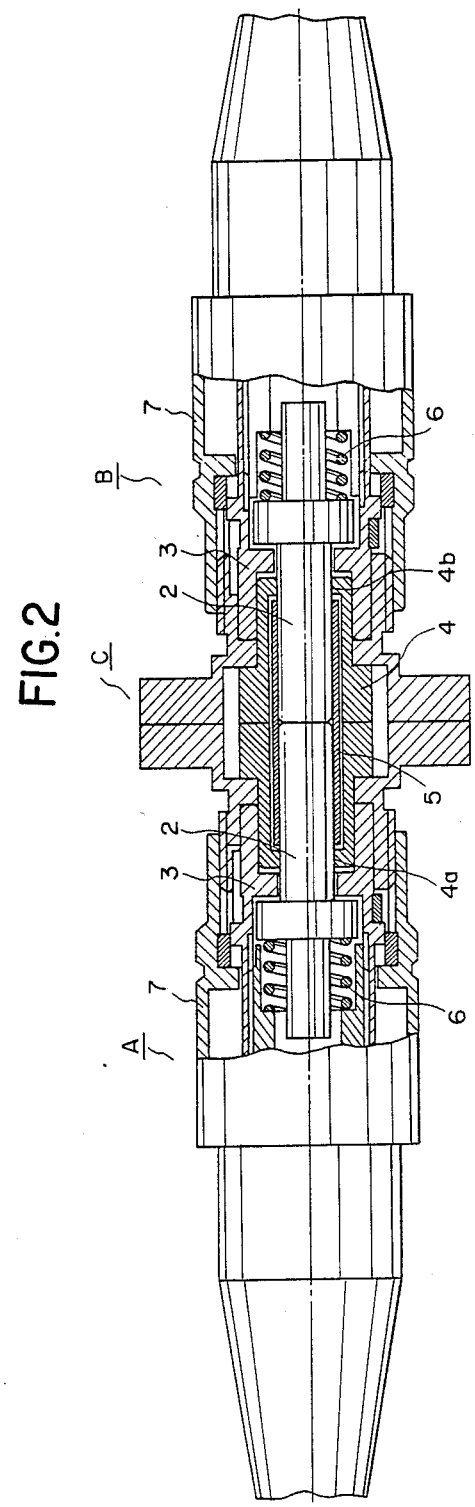

FIG. 4
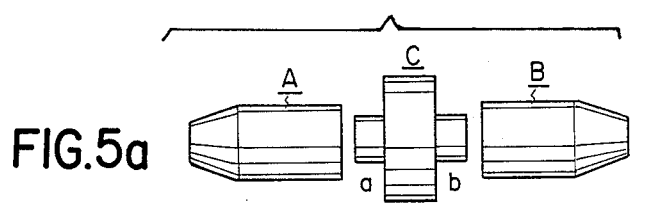
FIG. 5a
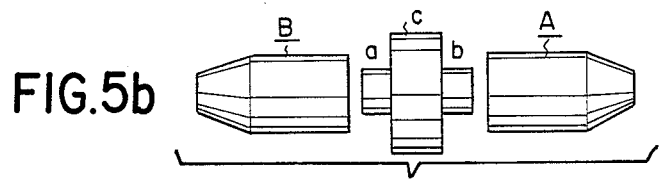
FIG. 5b
FIG. 6
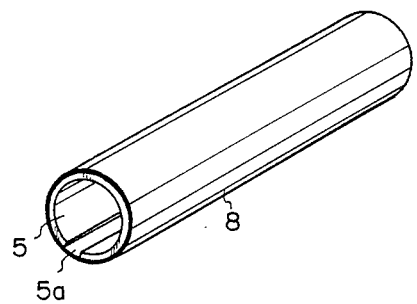

FIBER OPTIC CONNECTOR

BACKGROUND OF THE INVENTION

1. Field of the Invention

This invention relates to a connector for optical fibers.

2. Description of the Prior Art

In an optical fiber connector, in order to reduce connection loss it is important to minimize the mismatch of mutual ends of the optical fibers to be connected by maintaining a high degree of concentricity of the optical fibers. Previously, it has been proposed to achieve the desired concentricity by employing fiber-retaining ferrules in the connector shells and an adaptor which included an alignment sleeve having a longitudinal slit. When the ferrule of the plug connector is inserted into the adaptor, a spring force is generated by the split sleeve and this force was designed to maintain the ferrules concentric to each other, even when the ferrules faced each other in a slanting angle.

It has been found, however, that such conventional connectors exhibited increasingly high connection losses as the number of insertions and extractions were increased. Further, it has been found that the connection losses were greatly different depending upon into which end of the adaptor the plug connector was inserted.

It would be desirable to eliminate these shortcomings in order to achieve stable signal transmission passage.

SUMMARY OF THE INVENTION

In accordance with this invention, there is provided in a fiber optic connector assembly in which two fiber optic connectors are connected to each other by means of an adaptor, each of the connectors including at least one ferrule, the ferrules retaining an optical fiber, the ferrules being inserted in said adaptor such that the optical fiber of each connector is arranged in a light transmitting position with respect to the optical fiber of the other connector, the adaptor including at least one split sleeve for receiving at its opposite ends a ferrule from each of the connectors, the split sleeve having a longitudinal slit, the improvement comprising a tubularly shaped elastic body installed around the outer periphery of the split sleeve, the body applying a spring force to the periphery of the split sleeve.

Also in accordance with this invention, there is provided in an adaptor for connecting two fiber optic connectors, each of the connectors including at least one ferrule, the ferrules retaining an optical fiber, the ferrules being insertable in the adaptor such that the optical fiber of each connector is arranged in a light transmitting position with respect to the optical fiber of the other connector, the adapter including an internal bore, and a generally cylindrical sleeve positioned in the bore to receive the ferrules from the connectors, the sleeve having a longitudinal slit, the improvement comprising a tubularly shaped elastic body installed around the outer periphery of the sleeve, the body applying a spring force to the periphery of the sleeve.

It has been found that by employing a tubularly shaped elastic body, such as a plastic or rubber tube, around the split sleeve, the increase in connection losses in a conventional connector due to repeated insertions and extractions of the connector to the adaptor is reduced. Furthermore, the directionality of the connection losses of the conventional connector is reduced. This is achieved in an economical and simple fashion.

BRIEF DESCRIPTION OF THE DRAWINGS

FIG. 1 is an isometric view of a ferrule used in a conventional fiber optic connector shown in FIG. 2.

FIG. 2 is a cross-sectional view of a conventional fiber optic connector.

FIG. 3 is an isometric view of a split sleeve used in the connector of FIG. 2.

FIG. 4 is a diagrammatic view illustrating the correction of the ferrule position by the split sleeve.

FIG. 5a and FIG. 5b illustrate the direction of inserting and extracting the plug connector to the adaptor.

FIG. 6 is an isometric view of an example of the split sleeve design of this invention.

DESCRIPTION OF THE PREFERRED EMBODIMENT

Figure 7:
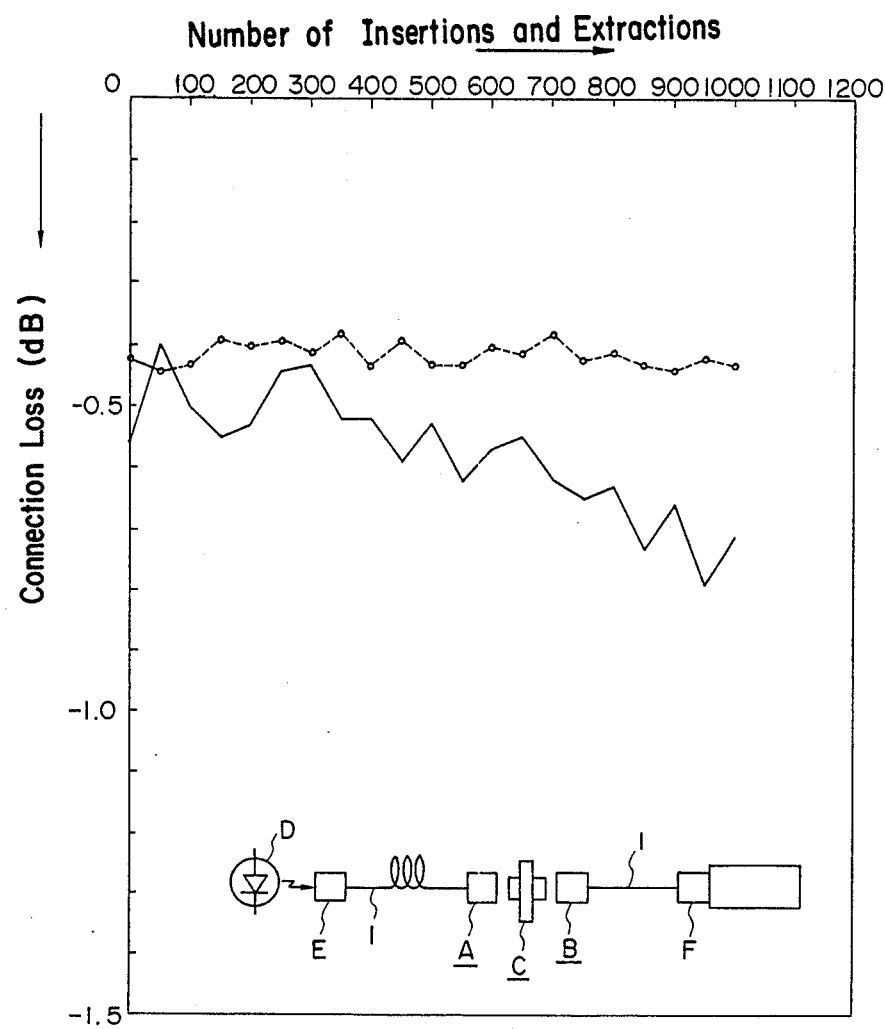
FIG. 7 is a graph showing the relationship between the number of insertions and extractions and the connection loss.

With regard to FIG. 2, there is shown two conventional fiber optic connectors coupled together with an adaptor. Plug connectors A and B each are formed to accommodate ferrules 2 within their shells 3. As shown in FIG. 1, ferrule 2 is a generally tubular structure having an exterior collar rearward of a frontal peripheral surface 2a. Optical fiber 1 is inserted within ferrule 2 in a conventional manner. Connectors A and B also are provided with central spring 6 which serve to apply a biasing force against the ferrule collars to urge the ferrules towards each other, the ferrules being movable within shells 3. Coupling nut 7 is utilized to fix the connectors to an adaptor C. Adaptor C has a central opening which receives a metallic split sleeve 5, which has a longitudinal slit in the axial direction of the sleeve. At opposite ends of the adaptor, insertion openings 4a, 4b are provided to receive ferrules 2.

In a design as described above, when the ferrule 2 is inserted into adaptor C, a spring force is generated which retains the ferrules concentric to each other. This is achieved automatically even when the ferrules are facing each other at a slanting angle as shown in FIG. 4.

In accordance with this invention, as shown in FIG. 6, a tubularly shaped elastic body 8 is provided about the outer periphery of the split sleeve of adaptor C. Elastic body 8 is preferably a plastic or rubber tube having an internal diameter which is suitably smaller than the outer diameter of the split sleeve 5. Elastic body 8 provides a spring force against sleeve 5. The preferred material of the elastic body is an ethylene propylene rubber, although other rubber or materials can be used. Examples of other synplastic thetic rubbers that can be used are acrylonitrile-butadiene rubber, chloroprene rubber, fluorinated rubber, silicone rubber epichlorohydrin rubber and the like. Instead of preforming such a tube having the desired internal diameter, alternatively a thermally shrinkable plastic tube, such as a polyolefin tube, can be employed which initially has an internal diameter larger than the outer diameter of the split sleeve, and then heat shrinking the tube about the sleeve.

By using such an elastic or resilient tube tightly surrounding the split sleeve, it has been surprisingly found that the connection loss remains constant regardless of the number of insertions and extractions, and the connection loss is substantially constant regardless of the direction of insertion of the plug connector to the adaptor. Although the reasons for these results are not certain, it is believed that they occur for the following reasons. The slit 5a of the metal split sleeve 5 initially provides a corrective spring force to ferrule 2. However, slit 5a gradually opens up due to fatigue as the insertions and extractions are repeated, and consequently the corrective spring force deteriorates resulting in an increase in the connection loss. When the tubularly shaped elastic body 8 is installed around the outer periphery of the sleeve in accordance with this invention, the spring force of the elastic body against the sleeve complements the reduction in the above-mentioned corrective spring force and thereby helps maintain the connection loss constant. As to the change in the connection loss due to the direction of insertion and extraction of the plug connector to the adaptor, this is believed to be due to the difference in the corrective spring force of the ferrule 2 at the two ends of the split sleeve 5 caused by various factors in the formation of the slit 5a. In the present design, however, elastic body 8 applies a spring force all around the split sleeve 5, thereby making the corrective spring force uniform.

Figure 8:
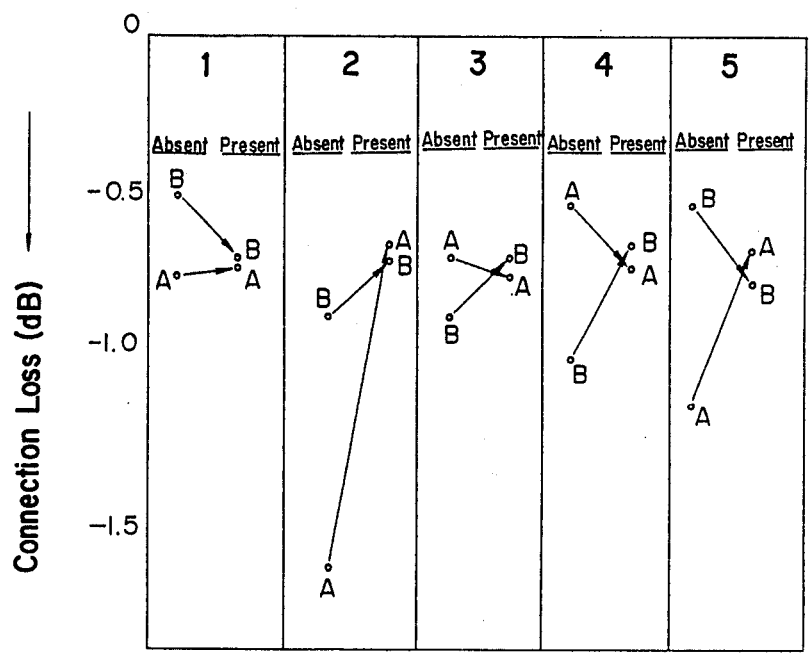
FIG. 8 is a graph showing the change in connection loss due to the difference in the direction of insertion and extraction of the plug connector to the adaptor.

The advantages of the present design are shown in the graphs of FIGS. 7 and 8. In FIG. 7, there is shown the relationship between the number of insertions and extractions of the plug connector to the adaptor (in the X-axis) and the connection loss for the case of a multi-mode optical fiber. Also illustrated in FIG. 7 is a measuring circuit for measuring the connection loss. In this case, an LED light source D supplies light to one end of the optical fiber 1 which is retained by plug connector E. A power meter F measures the amount of light transmitted across plug connector A, adaptor C and plug connector B, and through optical fiber 1. Plug connectors A and B can be inserted and extracted from adaptor C.

The results using a conventional split sleeve adaptor are shown in solid line in FIG. 7. In this case, the connection loss was about 0.5 dB initially, and this loss increased with the number of insertions and extractions. After 1000 cycles, the insertion loss was about 0.75 dB, which represents an increase of about 50 percent from the initial value. In contrast to this, when an adaptor having the tubularly shaped elastic body of this invention was used, the connection loss did not show an appreciable change with the number of insertions and extractions, as illustrated by the dotted line in the figure. The tubular body was formed from a crosslinked polyolefin which was heat shrunk onto the split sleeve.

FIG. 8 shows the change in connection loss with the difference in the direction of inserting the plug connectors A, B to the adaptor C for the case of single mode optical fiber. Reference is first made to FIGS. 5a and 5b which show the direction of inserting and extracting the plug connector to the adaptor. In FIG. 5a, plug connector A is inserted into end a of adaptor C and plug connector B is inserted into end b of adaptor C. In FIG. 5b, this is reversed, with plug connector being inserted into end b of adaptor C and plug connector B being inserted into end a of adaptor C. Since the split sleeve 5 does not have a directional property, the ferrules 2 of the connectors A, B can be inserted into the adaptor C from either direction.

FIG. 8 illustrates the change in connection loss for 5 samples in which the direction of inserting the plug connectors was changed. Each data value represents the average of five cycles of insertions and extractions. In this graph, A represents the case in which plug connector A is connected to the end a of adaptor C and plug connector B is connected to the end b of adaptor C, as shown in FIG. 5a. In contrast to this, B represents the FIG. 5b condition in which the insertion was done in the reverse direction. The first values for A and B are for the conventional connector in which the tubularly shaped elastic body 8 was absent, and the second values for A and B are for the connector of this invention in which elastic body 8 is present. The elastic body was the same as in FIG. 5.

As can be seen from FIG. 8, the difference in connection loss in the conventional connector is large depending upon the direction of insertion. There is considerably scatter for these values, with a maximum difference being in sample 2 from 0.9 dB loss for condition B to a 1.65 dB loss for condition A. In contrast, with the present design the connection loss is about the same for conditions A and B, and thus the direction of insertion has little effect on the connection loss. Furthermore, it can be seen that the fluctuation in connection loss between samples is much smaller than that of the conventional connector.

This invention thus provides a fiber optic connector in which a high degree of concentricity is achieved between the optical fibers. The present design reduces the increase in connection loss due to repeated insertions and extractions of the connector to the adaptor, as well as the directionality of the connection loss of the conventional connector. This is achieved in an economical and simple manner.

We claim:

1. In a fiber optic connector assembly in which two fiber optic connectors are connected to each other by means of an adaptor, each of the connectors including at least one ferrule, said ferrules retaining an optical fiber, and said ferrules being inserted in said adaptor such that the optical fiber of each connector is arranged in a light transmitting position with respect to the optical fiber of the other connector, the adaptor including at least one split sleeve for receiving at its opposite ends a ferrule from each of said connectors, said split sleeve having a longitudinal slit, the improvement comprising:
    a tubularly shaped elastic body installed around the outer periphery of said split sleeve, said body applying a spring force to the periphery of said split sleeve.

2. The connector assembly of claim 1 wherein said tubularly shaped elastic body comprises a plastic tube.

3. The connector assembly of claim 2 wherein the internal diameter of said tube is smaller than the outer diameter of said split sleeve.

4. The connector assembly of claim 2 wherein said plastic tube is formed from a heat shrinkable material.

5. The connector assembly of claim 4 wherein said plastic tube is a polyolefin tube.

6. The connector assembly of claim 1 wherein said tubularly shaped elastic body comprises a rubber tube.

7. The connector assembly of claim 6 wherein the internal diameter of said tube is smaller than the outer diameter of said split sleeve.

8. The connector assembly of claim 1 wherein said adaptor includes an internal bore, said split sleeve being positioned in said bore.

9. In an adaptor for connecting two fiber optic connectors, each of the connectors including at least one ferrule, said ferrules retaining an optical fiber, said ferrules being insertable in said adaptor such that the optical fiber of each connector is arranged in a light transmitting position with respect to the optical fiber of the other connector, said adaptor including an internal bore, and a generally cylindrical sleeve positioned in said bore to receive said ferrules from said connectors, said sleeve having a longitudinal slit, the improvement comprising:

a tubularly shaped elastic body installed around the outer periphery of said sleeve, said body applying a spring force to the periphery of said sleeve.

10. The adaptor of claim 9 wherein said tubularly shaped elastic body comprises a plastic tube.

11. The adaptor of claim 10 wherein said tube is smaller than the outer diameter of said sleeve.

12. The adaptor of claim 10 wherein said plastic tube is formed from a heat shrinkable material.

13. The adaptor of claim 12 wherein said plastic

14. The adaptor of claim 9 wherein said tubularly shaped elastic body comprises a rubber tube.

15. The adaptor of claim 14 wherein the internal diameter of said tube is smaller than the outer diameter of said sleeve.

16. In a fiber optic connector assembly in which two fiber optic connectors are connected to each other by means of an adaptor, each of the connectors including at least one ferrule, said ferrule retaining an optical fiber, and said ferrules being inserted in said adaptor such that the optical fiber of each connector is arranged in a light transmitting position with respect to the optical fiber of the other connector, the adaptor including at least one split sleeve for receiving at opposite ends a ferrule from each of said connectors, said split sleeve having a longitudinal slit, the improvement comprising:

said adaptor including an internal bore with said split sleeve positioned in said bore; and a tubularly shaped elastic body installed around the outer periphery of said split sleeve, said body applying a spring force to the periphery of said split sleeve and said body having an internal diameter smaller than the outer diameter of said split sleeve to thereby apply said spring force when mounted thereon.

17. The connector assembly of claim 16 wherein said elastic body comprises a tube made of a cross-linked polyolefin which was heat shrunk onto said split sleeve.

18. The connector assembly of claim 16 wherein said elastic body comprises a tube made of an ethylene propylene rubber.

19. In an adaptor for connecting two fiber optic connectors, each of the connectors including at least one ferrule, said ferrules retaining an optical fiber, said ferrules being insertable in said adaptor such that the optical fiber of each connector is arranged in a light transmitting position with respect to the optical fiber of the other connector, the improvement comprising: said adaptor including an internal bore with a generally cylindrical sleeve positioned in said bore to receive said ferrules from said connectors and with said sleeve having a longitudinal slit; and a tubularly shaped elastic body installed around the outer periphery of said sleeve, said body applying a spring force to the periphery of said sleeve and said body having an internal diameter smaller than the outer diameter of said split sleeve to thereby apply said spring force when mounted thereon.

20. The adaptor of claim 19 wherein said elastic body comprises a tube made of a cross-linked polyolefin which was heat shrunk onto said split sleeve.

21. The adaptor of claim 19 wherein said elastic body comprises a tube made of an ethylene propylene rubber.

* * * * *